US012683283B2

(12) United States Patent
Duan et al.

(10) Patent No.: US 12,683,283 B2
(45) Date of Patent: Jul. 14, 2026

(54) POWER DIVIDER NETWORK AND ANTENNA STRUCTURE

(71) Applicants: PROSE TECHNOLOGIES (SUZHOU) CO., LTD., Suzhou (CN); PROSE TECHNOLOGIES LLC, Mount Olive, NJ (US)

(72) Inventors: Zhiwen Duan, Suzhou (CN); Tao Jiang, Suzhou (CN); Ping Huang, Suzhou (CN); Jing Sun, Suzhou (CN); Xu Wang, Suzhou (CN)

(73) Assignees: PROSE TECHNOLOGIES (SUZHOU) CO., LTD., Suzhou (CN); PROSE TECHNOLOGIES LLC, Mount Olive, NJ (US)

( * ) Notice: Subject to any disclaimer, the term of this patent is extended or adjusted under 35 U.S.C. 154(b) by 0 days.

(21) Appl. No.: 18/812,067

(22) Filed: Aug. 22, 2024

(65) Prior Publication Data

US 2024/0421493 A1 Dec. 19, 2024

Related U.S. Application Data

(63) Continuation of application No. PCT/CN2022/137429, filed on Dec. 8, 2022.

(30) Foreign Application Priority Data

Feb. 23, 2022 (CN) ......................... 202210168831.4

(51) Int. Cl.
*H01Q 21/06* (2006.01)
*H01Q 9/06* (2006.01)

(52) U.S. Cl.
CPC .......... *H01Q 9/065* (2013.01); *H01Q 21/062* (2013.01)

(58) Field of Classification Search
CPC ........ H01Q 19/10; H01Q 1/246; H01Q 9/065; H01Q 21/06–08; H01P 5/12
See application file for complete search history.

(56) References Cited

U.S. PATENT DOCUMENTS 6,034,649 A * 3/2000 Wilson ..................... H01Q 9/28 343/797
6,072,439 A * 6/2000 Ippolito ................. H01Q 1/246 343/797

(Continued)

FOREIGN PATENT DOCUMENTS

CN 102354787 A 2/2012
CN 212412206 U 1/2021

(Continued)

OTHER PUBLICATIONS

The World Intellectual Property Organization (WIPO) International Search Report for PCT/CN2022/137429 Feb. 13, 2023 5 Pages (including translation).

(Continued)

*Primary Examiner* — Hasan Islam
(74) *Attorney, Agent, or Firm* — Anova Law Group, PLLC

(57) ABSTRACT

A power divider network includes a cover plate, a reflection plate, a support component, and a feed line. The reflection plate is arranged separately from the cover plate. A first surface of the reflection plate is a reflection surface. A plurality of connectors protrude from a second surface of the reflection plate opposite to the reflection surface. The plurality of connectors are arranged at intervals. The plurality of connectors are coupled with the cover plate and divide the space between the reflection plate and the cover plate into at least one hollow chamber. The support component is at least partially arranged in the hollow chamber. The feed line is (Continued)

arranged in the hollow chamber and mounted at the support component.

12 Claims, 8 Drawing Sheets

(56) References Cited

U.S. PATENT DOCUMENTS

| | | | | |
|---|---|---|---|---|
| 9,590,317 | B2 * | 3/2017 | Zimmerman | H01Q 9/0478 |
| 10,511,088 | B2 * | 12/2019 | Xiao | H01Q 19/108 |
| 11,552,385 | B2 * | 1/2023 | Xiao | H01Q 1/48 |
| 2010/0134374 | A1 | 6/2010 | Skalina et al. | |
| 2012/0075155 | A1 * | 3/2012 | Lindmark | H01Q 19/106 343/834 |
| 2014/0035698 | A1 | 2/2014 | Schadler et al. | |
| 2017/0271767 | A1 | 9/2017 | Nair et al. | |
| 2018/0248256 | A1 | 8/2018 | Xiao et al. | |
| 2020/0220252 | A1 | 7/2020 | Xiao et al. | |

FOREIGN PATENT DOCUMENTS

| | | | |
|---|---|---|---|
| CN | 112864574 | A | 5/2021 |
| CN | 216648568 | U | 5/2022 |
| CN | 114597621 | A | 6/2022 |
| WO | 2017070952 | A1 | 5/2017 |

OTHER PUBLICATIONS

The European Patent Office (EPO) The Extended European Search Report for Application No. 22928373.4 Dec. 18, 2025 10 Pages.

* cited by examiner

POWER DIVIDER NETWORK AND ANTENNA STRUCTURE

CROSS-REFERENCES TO RELATED APPLICATIONS

The present disclosure is a continuation of International Application No. PCT/CN2022/137429, filed on Dec. 8, 2022, which claims priority to Chinese Application No. 202210168831.4 filed on Feb. 23, 2022, the entire content of all of which are incorporated herein by reference.

TECHNICAL FIELD

The present disclosure generally relates to the antenna technology field and, more particularly, to a power division network and an antenna structure.

BACKGROUND

As an important member of a wireless communication system, a base station antenna plays an important function in the wireless communication network. When emitting a signal, the antenna converts a high-frequency current into an electromagnetic wave. When receiving a signal, the antenna converts the electromagnetic wave into a high-frequency current. A power divider network is an important device configured to synthesize and assign electromagnetic wave energy. The power divider network is configured to assign the input power to radiation units in the base station antenna. In practical applications, the power divider network often assigns a certain output power to sub-circuits with a certain ratio.

The existing power divider network is manufactured by directly adding a power divider circuit on a PCB board. A medium such as the PCB board will consume energy, and the power divider network will radiate energy into the air. Thus, the energy loss is large during the energy transmission of the dividend network.

SUMMARY

The purpose of the present disclosure is to provide a power divider network and an antenna structure, which can lower the dielectric loss and the loss of the power divider network.

The technical solution of the present disclosure includes the following aspects.

On one aspect, a power divider network is provided and includes:

a cover plate;

a reflection plate arranged separately from the cover plate, a first surface of the reflection plate being a reflection surface, wherein a plurality of connectors protrude from a second surface of the reflection plate opposite to the reflection surface, are arranged at intervals and electrically connected to the cover plate, and divide a space between the reflection plate and the cover plate into at least one hollow chamber;

a support component at least partially arranged in the hollow chamber; and a feed line arranged in the hollow chamber and mounted at the support component.

In some embodiments, the feed line is a strip line structure or a microstrip line structure; and/or a distance exists between the feed line and the cover plate, and a distance exists between the feed line and the reflection plate.

In some embodiments, the cover plate is made of metal, or a surface of the cover plate includes a metal plating layer; and the reflection plate is made of metal, or a surface of the reflection plate includes a metal plating layer.

In some embodiments, the plurality of connectors are arranged along a first direction of the reflection plate at intervals and extend along a second direction of the reflection plate, and the first direction is perpendicular to the second direction.

In some embodiments, the support component is made of plastic; and/or the support component point-supports or surface-supports the feed line.

In some embodiments, a cross-section of the hollow chamber is a rectangle, circle, or polygon.

On another aspect, an antenna structure is provided and includes a radiation unit and the power divider network of any one embodiment above. The radiation unit is arranged on the reflection surface of the reflection plate and electrically connected to the feed line.

In some embodiments, an adjustment member protrudes from the reflection surface of the reflection plate, and a wave width of an antenna is adjusted by adjusting a height of the adjustment member protruding from the reflection surface.

In some embodiments, the feed line is electrically connected to the radiation unit through a phase difference network.

In some embodiments, the radiation unit is a dipole radiation unit, and the feed line is electrically connected to the dipole radiation unit.

In some embodiments, the radiation unit is a slot feed radiation unit, and the feed line is electrically connected to the slot feed radiation unit.

The technical effect of the present disclosure includes:

1. The feed line is located in the hollow chamber between the reflection plate and the cover plate. Since the medium with the low dielectric constant is filled such as air, the dielectric loss can be lowered, and the energy may not be radiated into the air. Thus, the loss of the power divider network can be reduced.
2. The assembly of the power divider network and the radiation unit can be simple, and the strength of the antenna can be effectively enhanced. The assembly and welding can be easy. The welding stability and the welding precision can be improved, and the surface mounted technology (SMT) efficiency of the production line can be improved.
3. The antenna adopts the strip line feed network. Thus, the radiation efficiency can be good, and the communication quality can be great.
4. The antenna has a module design, which includes a flexible architecture, is easy to modify, and is easier to maintain.

BRIEF DESCRIPTION OF THE DRAWINGS

The present disclosure is further described in detail in connection with the accompanying drawings and embodiments of the present disclosure.

REFERENCE NUMERALS

10 Cover plate, 20 Reflection plate, 201 Reflection surface, 202 Connector, 203 First I-shaped slot, 204 Second I-shaped slot, 205 Third I-shaped slot, 206 Fourth I-shaped slot, 207 Adjustment member, 30 Support component, 40 Feed line, 50 Radiation unit, 60 Hollow chamber.

DETAILED DESCRIPTION OF THE EMBODIMENTS

To describe embodiments of the present disclosure or the technical solution of the existing technology in detail, embodiments of the present disclosure are described according to the accompanying drawings. Apparently, the accompanying drawings below are merely some embodiments of the present disclosure. For those ordinary skills in the art, without creative efforts, other accompanying drawings can be obtained according to the accompanying drawings and other embodiments.

To simplify the drawings, the drawings only illustrate members related to the present disclosure, which cannot represent the actual structure of a product. In addition, to make the drawings simple and facilitate understanding, members with the same structure or functions in some drawings, only one of the members can be illustrated, or only one of the members can be marked. In the present disclosure, "a" not only represents "only one" but also "more than one."

Furthermore, the term "and/or" used in the specification and the appended claims of the present disclosure can represent one or more combinations of the items listed and include these combinations.

In the present disclosure, it should be noted that, unless otherwise specified and limited, the terms "mounting," "connection," and "coupled" should be understood broadly. For example, the connection can be a fixed connection, a detachable connection, or an integrated connection. The connection can also be mechanical or electrical. The connection can be a direct connection or an indirect connection through an intermediate medium. The connection can also be a communication of the internal chamber of two elements. For those ordinary skills in the art, the meanings of the above terms in the present disclosure can be understood according to specific situations.

In addition, in the description of the present disclosure, the terms "first," "second," etc. are only used to differentiate and should not be construed as indicating or implying relative importance.

Figure 1:
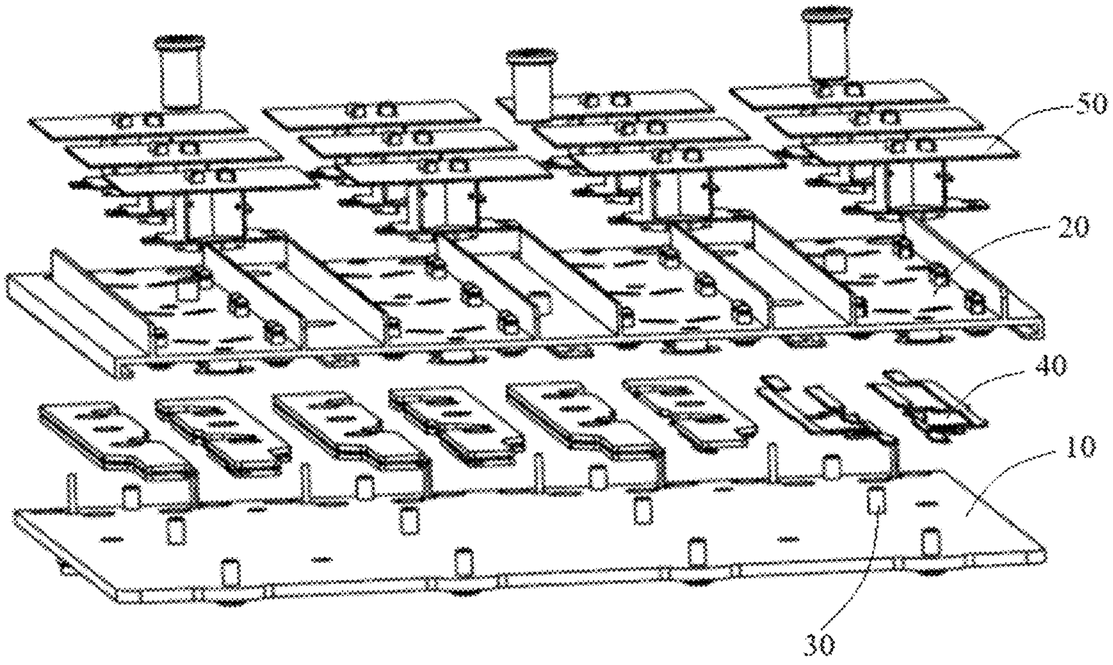
FIG. 1 is a schematic exploded diagram of an antenna structure according to some embodiments of the present disclosure.
Figure 2:
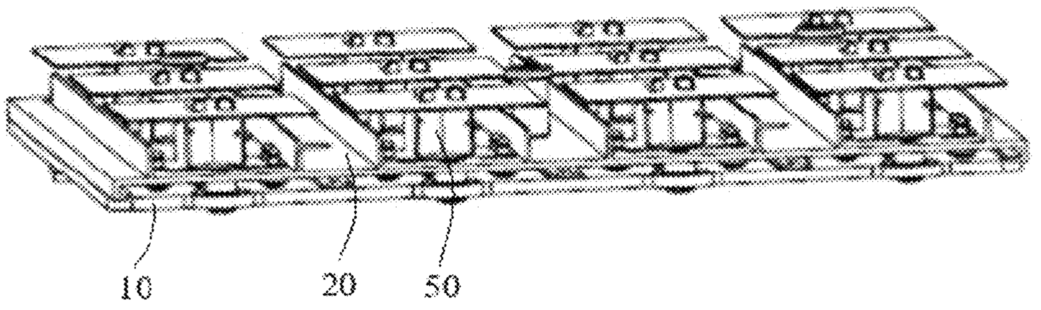
FIG. 2 is a schematic structural diagram of an antenna structure according to some embodiments of the present disclosure.
Figure 3:
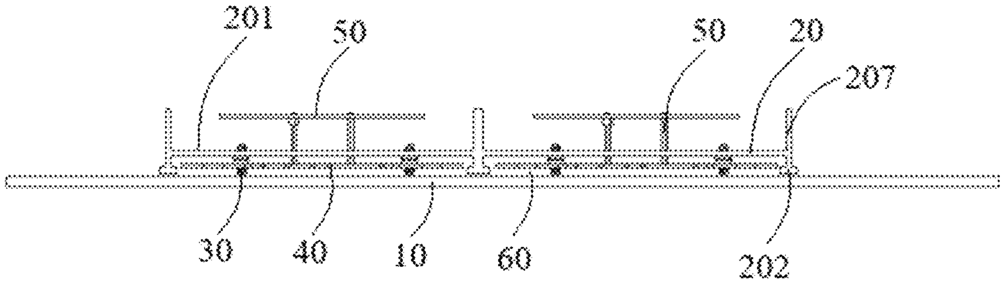
FIG. 3 is a schematic front view of an antenna structure according to some embodiments of the present disclosure.

In embodiments of the present disclosure, as shown in FIG. 1 to FIG. 3, a power divider network includes a cover plate 10, a reflection plate 20, a support component 30, and a feed line 40. The reflection plate 20 is arranged apart from the cover plate 10. A surface of the reflection plate 20 is as a reflection surface 201. A plurality of connectors 202 protrude from a surface opposite the reflection surface 201 of the reflection plate 20. As shown in FIG. 3, along an up and down direction in FIG. 3, the reflection surface 201 is the upper surface of the reflection plate 20, while the connectors 202 are arranged on the lower surface of the reflection plate 20. The upper surface (the reflection surface 201) of the reflation plate 20 is away from the cover plate 10. The lower surface of the reflection plate 20 is close to the cover plate 10. A reflection unit 50 is mounted above the reflection surface 201. The reflection surface 201 is configured to reflect a radiation wave emitted by the radiation unit 50. In the present disclosure, the reflection surface 201 of the reflection plate 20 is directly configured to reflect the radiation wave, and a separate reflection structure is no longer needed. Thus, the overall antenna structure is simple. The reflection surface 201 of the reflection plate 20 can be a flat surface or a curved surface.

The plurality of connectors 202 are arranged at intervals at the bottom of the reflection plate 20 and are integrally formed with the reflection plate 20. The plurality of connectors 202 can be arranged at intervals along a first direction of the reflection plate 20 and extend along a second direction of the reflection plate 20. The first direction can intersect with the second direction. In some embodiments, the first direction can be perpendicular to the second direction. The first direction of the reflection plate 20 can be the left and right direction in FIG. 3. The second direction of the reflection plate 20 can be the direction perpendicular to the paper surface in FIG. 3. The thickness direction of the reflection plate 20 is the up and down direction in FIG. 3.

The connectors 202 can be electrically connected to the cover plate 10. The connectors 202 can be directly connected to the cover plate 10 to realize the electrical connection or indirectly connected (e.g., coupling connection) to realize the electrical connection. After the connectors 202 are arranged at the cover plate 10, a distance can exist between the reflection plate 20 and the cover plate 10 through the support of the connectors 202. The distance between the reflection plate 20 and the cover plate 10 can be divided into a plurality of hollow chambers 60 by the connectors 202. The plurality of hollow chambers 60 can be arranged sequentially along the length direction of the reflection plate 20. A cross-section of a hollow chamber 60 can be a rectangle, circle, or polygon. The cover plate 10 can be made of metal, or a surface of the cover plate 10 can include a metal plating layer. The reflection plate 20 can be made of metal, or a surface of the reflection plate 20 can include a metal plating layer. Thus, the reflection plate 20 can be electrically connected to the cover plate 10. The connectors 202 and the cover plate 10 can be fixed connected in a medium spaced coupling method, or directly connected through metal contact. The reflection plate 20 can be formed by sheet metal or metal die-casting, and the cover plate 10 can be formed by metal die-casting or pultrusion.

The support component 30 can be arranged in the hollow chamber 60. The feed line 40 can be arranged in the hollow chamber 40 and located at the support component 30. The support component 30 can be configured to support the feed line 40 in the hollow chamber 60. The support component 30 can be formed integrally with the cover plate 10 or separately from the cover plate 10. The support component 30 can be made of plastic. The support component 30 can have a cylindrical structure and be configured to point support the feed line 40, or have a plate structure and be configured to surface-support the feed line 40. When the support component 30 surface-supports the feed line 40, a flatness of the support component 30 supporting the feed line 40 can be improved to improve the consistency of the power divider network. When the support component 30 point-supports the feed line 40, a plurality of support points are needed, which is not as convenient as surface support for installation, and has higher complexity than the surface support.

When the power divider network is installed, the feed line 40 can be mounted at the support component 30 first. Then, the cover plate 10 can be mounted at the reflection plate 20. When the radiation unit 50 needs to be installed, the radiation unit 50 can be first connected to the feed line 40, and the cover plate 40 can be then mounted at the reflection plate 20.

In some embodiments, the feed line 40 can be arranged between the reflection plate 20 and the cover plate 10. By using the air as a medium, the reflection plate 20 and the cover plate 10 as the ground for the feed line 40, since the filling medium is the air. The air dielectric loss is small, which reduces the dielectric loss. Thus, loss of the power divider network can be reduced. Moreover, the feed line 40 can be arranged in the hollow chamber 60 and does not radiate energy into the air, which can further reduce the loss of the power divider network.

In some embodiments, the feed line 40 can have a strip line structure or a microstrip line structure. Thus, the feed line 40 can have good radiation efficiency and good communication quality. The power divider network of embodiments of the present disclosure can be applied in the antenna. When the feed line 40 is the microstrip line, the loss factor of the antenna can be 0.0025, and the gain of the antenna is 10.5 dB. When the feed line 40 is a strip line, the loss factor of the antenna can be 0.001, and the gain of the antenna can be 10.9 dB.

A distance may exist between the feed line 40 and the cover plate 10. A distance may exist between the feed line 40 and the reflection plate 20. The feed line 40 may not contact the reflection plate 20 and the cover plate 10. Since the filling medium between the feed line 40 and the reflection plate 20 and the feed line 40 and the cover plate 10 is the air, the medium loss can be reduced, and the loss of the power divider network. The medium between the feed line 40 and the reflection plate 20 and between the feed line 40 and the cover plate 10 can be filled with a medium with lower dielectric constant and dielectric loss as needed to reduce the dielectric loss and reduce the loss of the power divider network.

The present disclosure further provides embodiments of an antenna structure. As shown in FIG. 1 to FIG. 3, the antenna structure includes the radiation unit 50 and the power divider network of any one of the above embodiments. The radiation unit 50 is arranged on the reflection surface 201 of the reflection plate 20 and electrically connected to the feed line 40. The radiation unit 50 can be electrically connected to the reflection plate 20 in the medium-spaced coupling method or through the direct connection with metal contact. A plurality of radiation units 50 can be provided. The plurality of radiation units 50 can be arranged sequentially at the reflection plate 20 along the first direction and the second direction of the reflection plate 20.

Further, an adjustment member 207 can protrude from the reflection surface 201 of the reflection plate 20. By adjusting the height of the adjustment member 207 protruding from the reflection surface 201, the wave width of the antenna can be adjusted.

Figure 4:
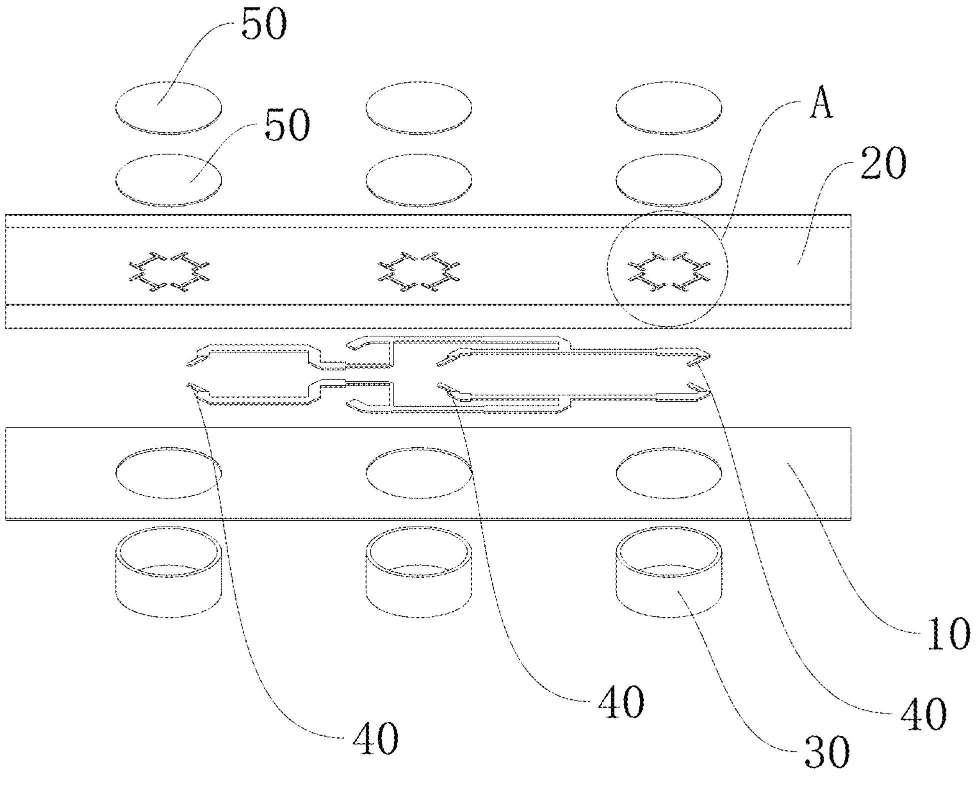
FIG. 4 is a schematic exploded structural diagram showing a slot feed radiation unit and a feed line of an antenna structure according to some embodiments of the present disclosure.
Figure 5:
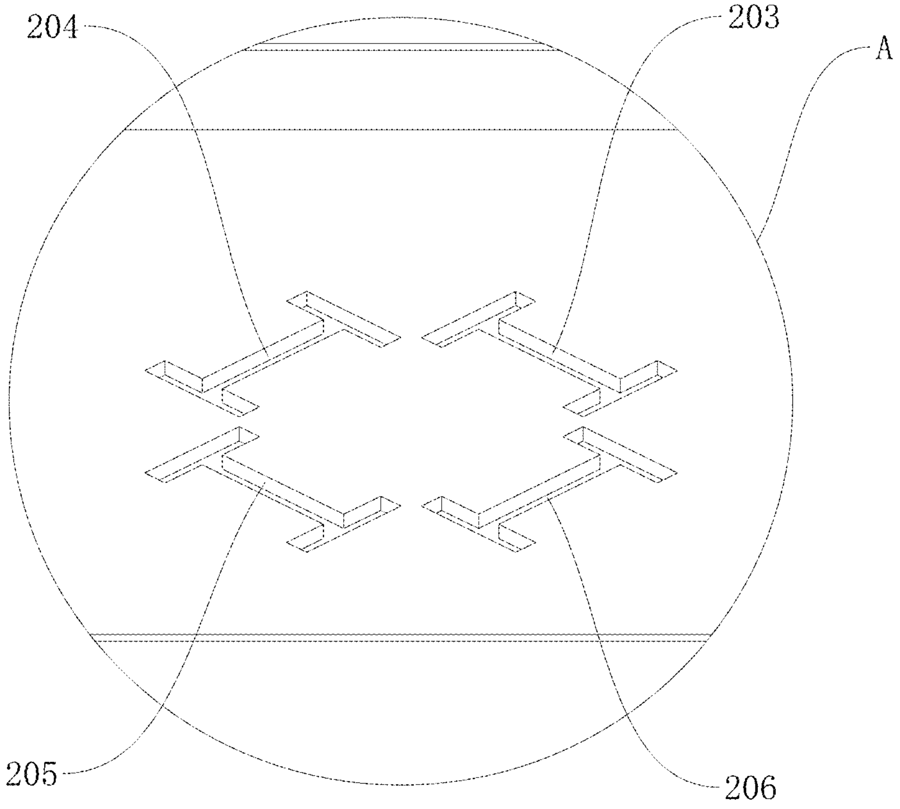
FIG. 5 is an enlarged view in FIG. 5.
Figure 6:
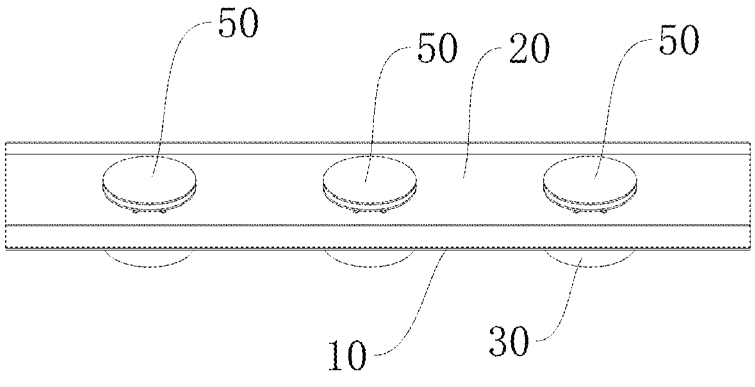
FIG. 6 is a schematic structural diagram of a combination in FIG. 4.

In some embodiments, as shown in FIG. 4 to FIG. 6, the radiation unit 50 is a slot feed radiation unit. The feed line 40 is electrically connected to the slot feed radiation unit. As shown in FIG. 4, the reflection plate 20 includes the slot feed radiation unit. The feed line 40 is electrically connected to the slot feed radiation unit. As shown in FIG. 5, the slot feed radiation unit includes four I-shaped slots, including a first I-shaped slot 203, a second I-shaped slot 204, a third I-shaped slot 205, and a fourth I-shaped slot 206. The first I-shaped slot 203, the second I-shaped slot 204, the third I-shaped slot 205, and the fourth I-shaped slot 206 are arranged end-to-end to form an annular structure. The slot feed radiation unit can have a symmetrical structure. In some embodiments, the slot feed radiation unit can have a symmetrical structure for optimizing for main polarization and cross-polarization.

Figure 7:
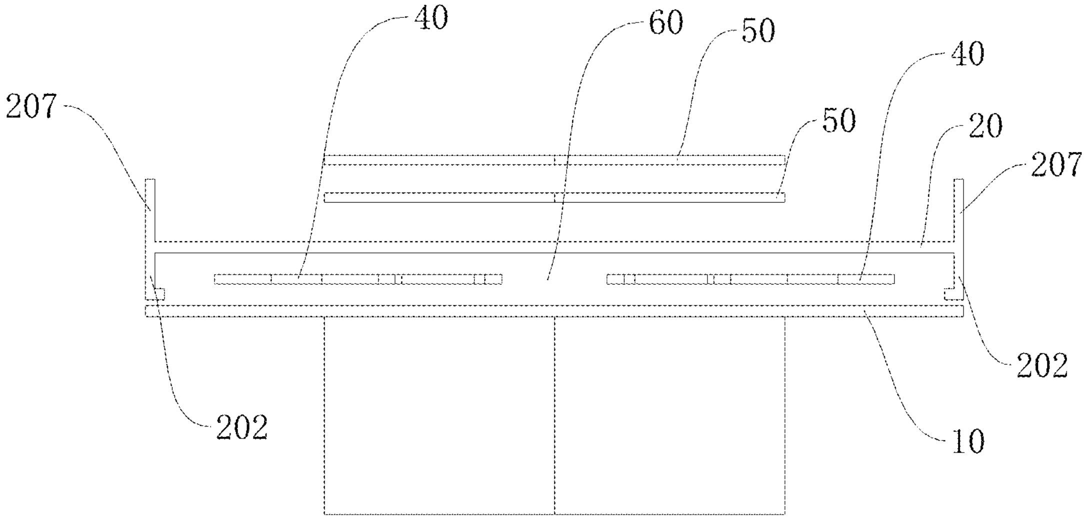
FIG. 7 is a schematic structural diagram showing an electrical connection between the slot feed radiation unit and a feed line and positive and negative polarizations share a common chamber according to some embodiments of the present disclosure.

The negative and positive polarizations of the antenna structure of the present disclosure can share the chamber or can be arranged in separate chambers. As shown in FIG. 7, when the positive and negative polarizations share the chamber, two feed lines 40 of the positive and negative polarizations are arranged in the same hollow chamber 60. When the positive and negative polarizations are in separate chambers, the feed line 40 of the positive polarization and the feed line 40 of the negative polarization can be arranged in different hollow chambers 60.

Figure 8:
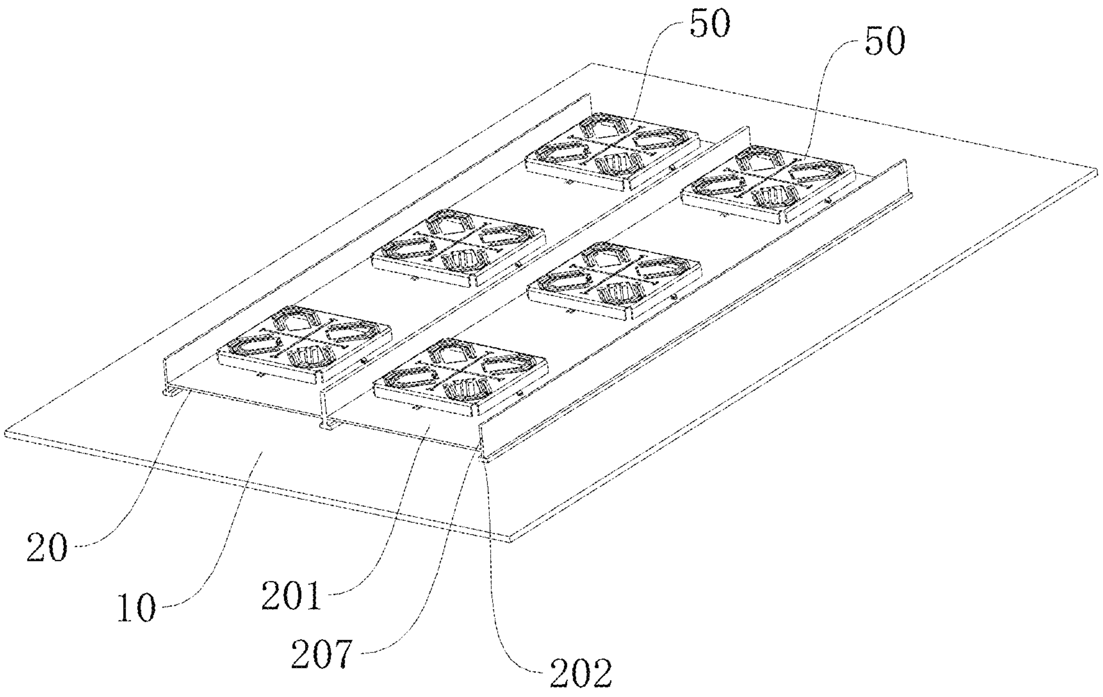
FIG. 8 is a schematic structural diagram showing an electrical connection between a radiation unit and a feed line of an antenna structure through a phase difference network according to some embodiments of the present disclosure.
Figure 9:
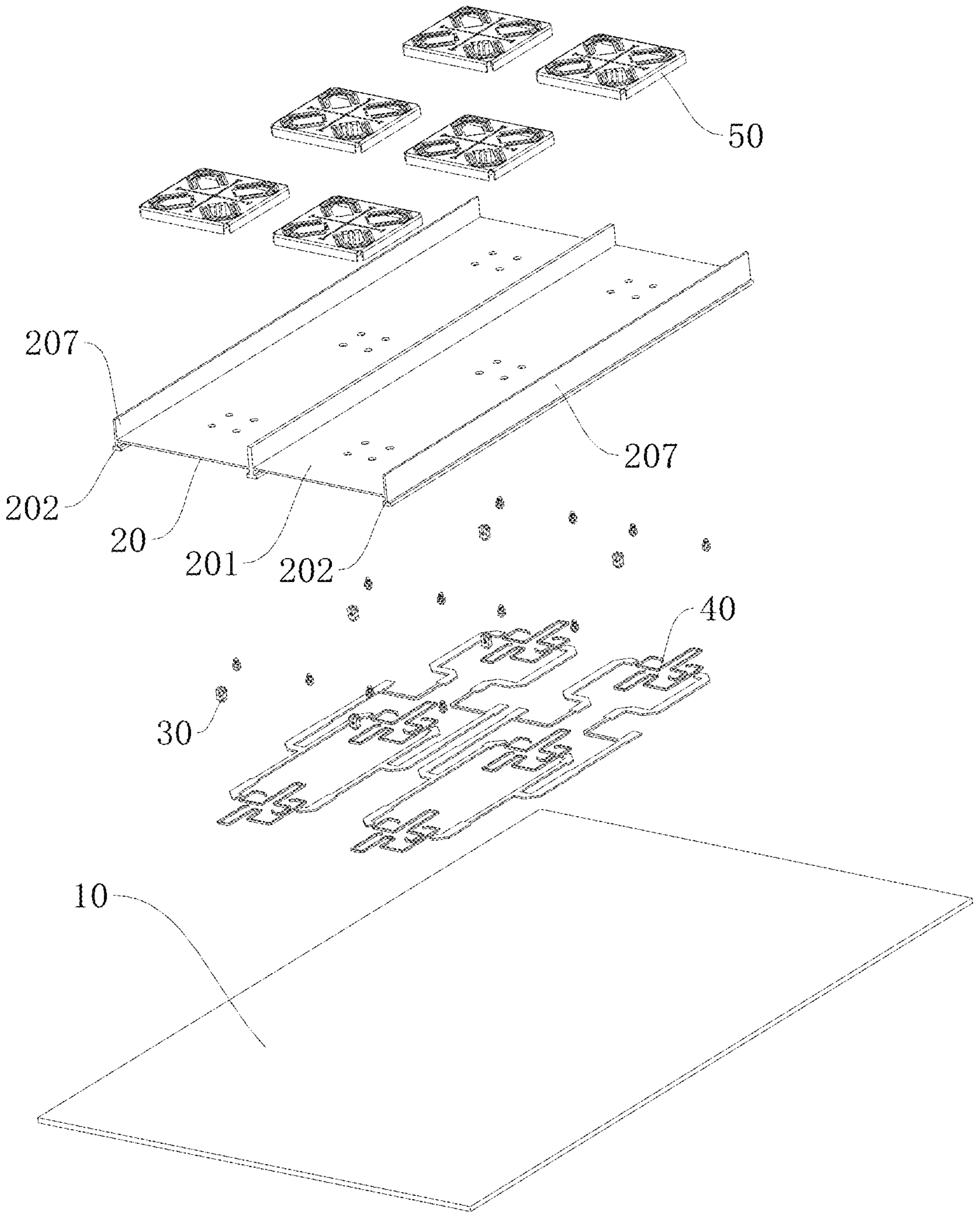
FIG. 9 is a schematic diagram of a divided structure of FIG. 8.

In some other embodiments, as shown in FIG. 8 and FIG. 9, the feed line 40 is electrically connected to the radiation unit 50 through a phase difference feed network. A four-point feed unit can be electrically connected to the radiation surface through the phase difference network for two-point feeding. The feed phase difference can include 90 deg, 90 deg, and 180 deg. The four-point feed can provide better cross-polarization and a lower array section. Meanwhile, the four-point feed array can have a simple structure and can be easy to assemble.

Figure 10:
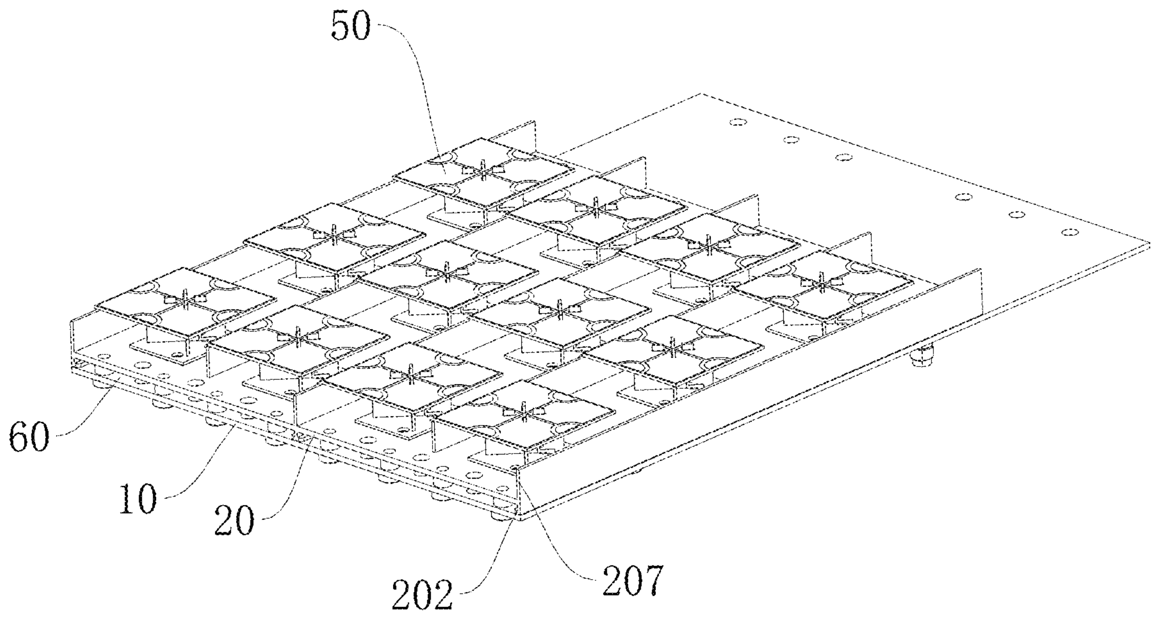
FIG. 10 is a schematic structural diagram showing an electrical connection between a dipole radiation unit and a feed electrical circuit of an antenna structure according to some embodiments of the present disclosure.
Figure 11:
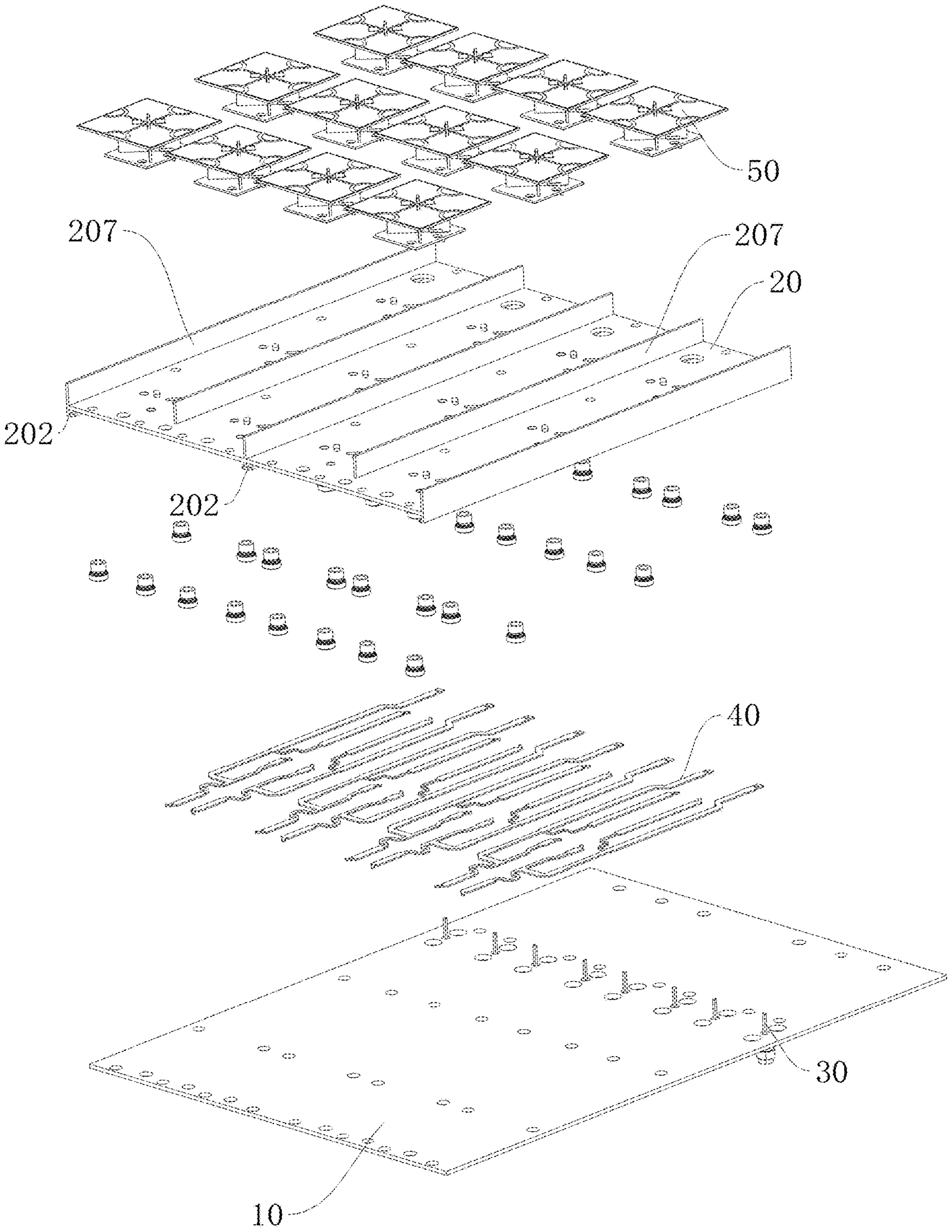
FIG. 11 is a schematic diagram of a divided structure of FIG. 10.

In some other embodiments, as shown in FIG. 10 and FIG. 11, the radiation unit 50 is a dipole radiation unit. The feed line 40 is electrically connected to the dipole radiation unit. Feeding by being connected to the radiation surface through quarter-wavelength baluns, a better directional symmetry and fewer welding points can be achieved. The balun can be used to balance the feeding.

The above are merely some implementations of the present disclosure. For those skilled in the art, various modifications and improvements can be made without departing from the principles of the present disclosure, and these modifications and improvements should also be within the scope of the present disclosure.

What is claimed is:

1. A power divider network comprising:

a cover plate;

a reflection plate arranged separately from the cover plate, a first surface of the reflection plate being a reflection surface, wherein a plurality of connectors protrude from a second surface of the reflection plate opposite to the reflection surface, are arranged at intervals and electrically connected to the cover plate, and divide a space between the reflection plate and the cover plate into at least one hollow chamber;

a support component made of plastic and at least partially arranged in the hollow chamber; and a feed line arranged in the hollow chamber and mounted at the support component.

2. The power divider network according to claim 1, wherein:

the feed line is a strip line structure or a microstrip line structure.

3. The power divider network according to claim 1, wherein:

a first distance exists between the feed line and the cover plate, and a second distance exists between the feed line and the reflection plate.

4. The power divider network according to claim 1, wherein:

the cover plate is made of metal, or a surface of the cover plate includes a metal plating layer; and the reflection plate is made of metal, or a surface of the reflection plate includes a metal plating layer.

5. The power divider network according to claim 1, wherein:

the plurality of connectors are arranged along a first direction of the reflection plate at intervals and extend along a second direction of the reflection plate; and the first direction is perpendicular to the second direction.

6. The power divider network according to claim 1, wherein:

the support component point-supports or surface-supports the feed line.

7. The power divider network according to claim 1, wherein a cross-section of the hollow chamber is a rectangle, circle, or polygon.

8. An antenna structure comprising:

a radiation unit;

a power divider network, comprising:

a cover plate;

a reflection plate arranged separately from the cover plate, a first surface of the reflection plate being a reflection surface, wherein a plurality of connectors protrude from a second surface of the reflection plate opposite to the reflection surface, are arranged at intervals and electrically connected to the cover plate, and divide a space between the reflection plate and the cover plate into at least one hollow chamber;

a support component made of plastic and at least partially arranged in the hollow chamber; and a feed line arranged in the hollow chamber and mounted at the support component;

wherein the radiation unit is arranged on the reflection surface of the reflection plate and electrically connected to the feed line.

9. The antenna structure according to claim 8, wherein:

an adjustment member protrudes from the reflection surface of the reflection plate; and a wave width of an antenna is adjusted by adjusting a height of the adjustment member protruding from the reflection surface.

10. The antenna structure according to claim 8, wherein the feed line is electrically connected to the radiation unit through a phase difference network.

11. The antenna structure according to claim 8, wherein the radiation unit is a dipole radiation unit, and the feed line is electrically connected to the dipole radiation unit.

12. The antenna structure according to claim 8, wherein the radiation unit is a slot feed radiation unit, and the feed line is electrically connected to the slot feed radiation unit.

* * * * *